US009939543B2

(12) United States Patent
Beasley et al.

(10) Patent No.: US 9,939,543 B2
(45) Date of Patent: Apr. 10, 2018

(54) SEISMIC DATA ENHANCEMENT

(71) Applicant: Schlumberger Technology Corporation, Sugar Land, TX (US)

(72) Inventors: Craig J. Beasley, Houston, TX (US); Ian Moore, New Plymouth (NZ); Robin Fletcher, Guildford (GB); Clara Castellanos Lopez, Gatwick (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 135 days.

(21) Appl. No.: 14/988,592

(22) Filed: Jan. 5, 2016

(65) Prior Publication Data
US 2017/0192116 A1 Jul. 6, 2017

(51) Int. Cl.
*G01V 1/36* (2006.01)
*G01V 1/38* (2006.01)

(52) U.S. Cl.
CPC ............ *G01V 1/364* (2013.01); *G01V 1/3808* (2013.01); *G01V 2210/56* (2013.01); *G01V 2210/57* (2013.01)

(58) Field of Classification Search
CPC .. G01V 1/364; G01V 1/3808; G01V 2210/57; G01V 2210/56
USPC .......................................................... 367/21
See application file for complete search history.

(56) References Cited

U.S. PATENT DOCUMENTS

| | | | |
|---|---|---|---|
| 5,924,049 A | 7/1999 | Beasley et al. | |
| 6,611,726 B1 * | 8/2003 | Crosswhite | G06F 17/18 700/100 |
| 6,882,938 B2 * | 4/2005 | Vaage | G01V 1/364 367/38 |
| 2013/0176819 A1 | 7/2013 | Poole | |
| 2013/0194893 A1 | 7/2013 | Gordon | |
| 2015/0276958 A1 | 10/2015 | Khalil et al. | |

FOREIGN PATENT DOCUMENTS

| | | |
|---|---|---|
| WO | 2015/023265 A1 | 2/2015 |
| WO | 2015/178931 A1 | 11/2015 |

OTHER PUBLICATIONS

International Search Report for the equivalent International patent application PCT/US2016/067899 dated Apr. 11, 2017.

(Continued)

*Primary Examiner* — Daniel L Murphy
(74) *Attorney, Agent, or Firm* — Michael Guthrie

(57) ABSTRACT

Various implementations described herein are directed to methods for processing seismic data including enhancing seismic data generated by a seismic sensor. The methods may include receiving seismic data that had been acquired using the seismic sensor. The seismic data may include one or more first seismic data elements related to a first seismic event. The methods may include generating summands of the seismic data as an inner product of multiple seismic data elements associated with the first seismic data elements and one or more second seismic data elements. The second seismic data elements may be different than the first seismic data elements. The methods may further include enhancing the seismic data by estimating outliers in the summands of the inner product and replacing the outliers with interpolated values.

19 Claims, 5 Drawing Sheets

(56) References Cited

OTHER PUBLICATIONS

Abma, et al., "High quality separation of simultaneous sources by sparse inversion," 72nd EAGE Conference and Exhibition, Barcelona, Spain, Jun. 14-17, 2010, B003.
Beasley, et al., "A 3D simultaneous source field test processed using alternating projections: A new active separation method," Geophysical Prospecting, vol. 60 No. 4, Jul. 2012, pp. 591-601.
Cadzow, "Signal Enhancement—A Composite Property Mapping Algorithm," IEEE Transactions on Acoustics, Speech, and Signal Processing, vol. 36, Issue 1, Jan. 1, 1988, pp. 49-62.
Canales, "Random noise reduction," 54th Annual International Meeting, SEG, Expanded Abstracts, 1984, pp. 525-527.
Claerbout, "Toward a Unified Theory of Reflector Mapping," Geophysics, 1971, vol. 36, No. 3, pp. 467-481.
Claerbout, "Conjugate Gradient Tutorial," Stanford Exploration Project Report # 48, 1985, pp. 351-358.
Ibrahim, et al., "Simultaneous source separation using a robust Radon transform," Geophysics, 2014, vol. 79, No. 1, pp. V1-V11.
Moore, et al., "Simultaneous source separation using dithered sources," 78th Annual International Meeting, 2008, SEG, Expanded Abstracts, pp. 2806-2810.
Moore, "Simultaneous Sources—Processing and Applications," 72nd EAGE Conference and Exhibition, 2010, Barcelona, Spain, Jun. 14-17, 2010, B001.
Moore, et al., "Simultaneous sources: The inaugural full-field, marine seismic case history from Australia," 22nd International Geophysical Conference and Exhibition, Feb. 26-29, 2012, Brisbane, Australia, pp. 1-4.
Shevlyakov, et al., "Robust Estimation of the Correlation Coefficient: An Attempt of Survey," Austrian Journal of Statistics, 2011, vol. 40 No. 1 & 2, pp. 147-156.
Stefani, et al., "Acquisition Using Simultaneous Sources," EAGE 69th Conference & Exhibition—London, UK, Jun. 11-14, 2007.

\* cited by examiner

SEISMIC DATA ENHANCEMENT

BACKGROUND

Seismic exploration involves surveying subterranean geological formations for hydrocarbon deposits. A seismic survey may involve deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (e.g., hydrophones), others to particle motion (e.g., geophones or accelerometers), and industrial surveys may deploy one type of sensors or both. In response to the detected seismic events, the sensors generate electrical signals to produce seismic data. Analysis of the seismic data may be used to determine the presence or the absence of probable locations of hydrocarbon deposits.

SUMMARY

Described herein are implementations of various technologies of a method for enhancing seismic data generated by a seismic sensor. In some implementations, the method may include receiving seismic data that had been acquired using the seismic sensor. The seismic data may include one or more first seismic data elements related to a first seismic event. The method may include generating summands of the seismic data as an inner product of multiple seismic data elements associated with the first seismic data elements and one or more second seismic data elements. The second seismic data elements may be different than the first seismic data elements. The method may include enhancing the seismic data by estimating outliers in the summands of the inner product and replacing the outliers with interpolated values.

Described herein are implementations of various technologies of a device for enhancing seismic data generated by a seismic sensor. In some implementations, the device may include a processor and memory having instructions stored thereon that, when executed by the processor, cause the processor to process seismic data including enhancing seismic data. The instructions may be configured to cause the processor to receive seismic data that had been acquired using the seismic sensor and apply a data processing algorithm to the received seismic data. The data processing algorithm may be configured to use an inner product. The instructions may be configured to cause the processor to generate an enhanced inner product by estimating outliers in the inner product, removing the outliers, and replacing the removed outliers with interpolated values. The instructions may be further configured to cause the processor to enhance the seismic data by replacing the inner product with the enhanced inner product.

Described herein are implementations of various technologies related to a non-transitory computer-readable medium having stored thereon a plurality of computer-executable instructions which, when executed by a computer, cause the computer to enhance seismic data generated by a seismic sensor. In some implementations, the instructions may be configured to cause the computer to receive seismic data that had been acquired using the seismic sensor and apply a data processing algorithm to the received seismic data. The data processing algorithm may be configured to use an inner product. The instructions may be configured to cause the computer to generate an enhanced inner product by estimating outliers in the inner product, removing the outliers, and replacing the removed outliers with interpolated values. The instructions may be further configured to cause the computer to enhance the seismic data by replacing the inner product with the enhanced inner product.

The above referenced summary section is provided to introduce a selection of concepts in a simplified form that is further described in the detailed description section herein below. The summary is not intended to limit the scope of the claimed subject matter. The claimed subject matter is not limited to implementations that solve any disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate the various implementations described herein and are not meant to limit the scope of various techniques described herein.

DETAILED DESCRIPTION

Figure 1:
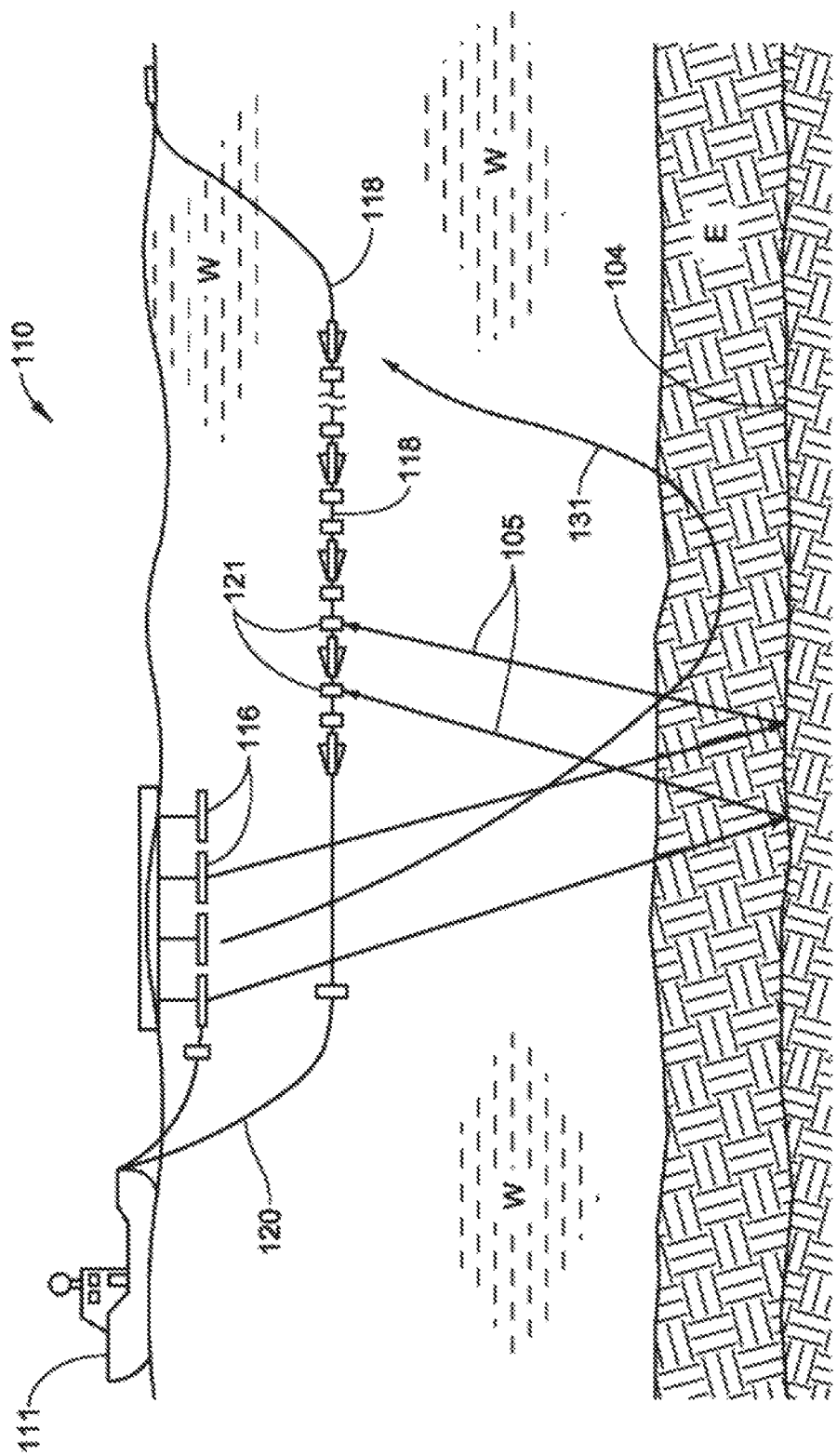
FIG. 1 illustrates a diagram of a marine system for acquiring seismic data in accordance with implementations of various techniques described herein.

The discussion below is directed to certain specific implementations. It is to be understood that the discussion below is for the purpose of enabling a person with ordinary skill in the art to make and use any subject matter defined now or later by the patent "claims" found in any issued patent herein.

It will also be understood that, although the terms first, second, etc. may be used herein to describe various elements, these elements should not be limited by these terms. These terms are used to distinguish one element from another. For example, a first object or block could be termed a second object or block, and, similarly, a second object or block could be termed a first object or block, without departing from the scope of the disclosure. The first object or block, and the second object or block, are both objects or blocks, respectively, but they are not to be considered the same object or block.

The terminology used in the description herein is for the purpose of describing particular implementations and is not intended to limit the claimed subject matter. As used herein, the singular forms "a", "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises," and/or "comprising," when used in this specification, specify the presence of stated features, integers, blocks, operations, elements, and/or components, but do not preclude the presence or addition of one or more other features, integers, blocks, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Reference will now be made in detail to various implementations, examples of which are illustrated in the accompanying drawings and figures. In the following detailed description, numerous specific details are set forth in order to provide a thorough understanding of the claimed subject matter. However, it will be apparent to one of ordinary skill in the art that the claimed subject matter may be practiced without these specific details. In other instances, well known methods, procedures, components, circuits, and networks have not been described in detail so as not to unnecessarily obscure aspects of the claimed subject matter.

The following paragraphs provide various techniques for enhancing seismic data that had been acquired using one or more seismic sensors, which will now be described in more detail with reference to FIGS. 1-5.

Seismic Surveying Systems and Methods

FIG. 1 illustrates a diagram of a marine system for acquiring seismic data in accordance with implementations of various techniques described herein.

As shown in FIG. 1, a marine seismic acquisition system 110 may include a vessel 111 carrying control components and towing a plurality of seismic sources 116 and a plurality of streamers 118 equipped with seismic receivers 121. The seismic sources 116 may include a single type of source, or different types. The seismic sources 116 may use any type of seismic generator, such as air guns, water guns, steam injection sources, controllable seismic sources, explosive sources, such as, e.g., dynamite or gas injection, followed by detonation and the like. The streamers 118 may be towed by means of their respective lead-ins 120, which may be made from high strength steel or fiber-reinforced cables that convey electrical power, control, and data signals between the vessel 111 and the streamers 118. An individual streamer may include a plurality of seismic receivers 121 that may be distributed at spaced intervals along the streamer's length. The seismic receivers 121 may include various seismic sensors, such as, e.g., hydrophone sensors as part of a multi-component sensor device including other seismic sensors, such as, e.g., one or more accelerometers. The streamers 118 may include a plurality of inline streamer steering devices (SSDs), also known as "birds." The SSDs may be distributed at appropriate intervals along the streamers 118 for controlling the streamers' depth and lateral movement. A single survey vessel may tow a single receiver array along individual sail lines, or a plurality of survey vessels may tow a plurality of receiver arrays along a corresponding plurality of the sail lines.

During acquisition, the seismic sources 116 and the seismic streamers 118 may be deployed from the vessel 111 and towed slowly to traverse a region of interest. The seismic sources 116 may be periodically activated to emit seismic energy in the form of an acoustic or pressure wave through the water. The sources 116 may be activated individually or substantially simultaneously with other sources. The acoustic wave may result in one or more seismic wavefields that travel coherently into the earth E underlying the water W. As the wavefields strike interfaces 104 between earth formations, or strata, they may be reflected and/or refracted back through the earth E and water W along paths 105 to the various receivers 121 where the wavefields (e.g., pressure waves in the case of air gun sources) may be converted to electrical signals, digitized and transmitted to the integrated computer-based seismic navigation, source controller, and recording system in the vessel 111 via the streamers 118 and lead-ins 120. For instance, a refracting or diving wave path 131 is shown passing through the earth E and water W from the sources 116 to the seismic receivers 121. Through analysis of these detected signals, it may be possible to determine the shape, position, and/or lithology of the subsea formations, including those formations that may include hydrocarbon deposits. While a marine based seismic survey is described in regard to FIG. 1, implementations of various techniques described herein may also be used in connection to a land based seismic survey.

In various implementations, the seismic sensors may include one or more geophones, hydrophones, inclinometers, particle displacement sensors, optical sensors, particle velocity sensors, accelerometers, pressure gradient sensors, or combinations thereof. In some implementations, a multi-component seismic sensor may include three orthogonally-aligned accelerometers (e.g., three-component micro-electro-mechanical system (MEMS) accelerometer orthogonally-aligned in x, y, and z directions) to measure three corresponding orthogonal x-y-z components of particle velocity and/or acceleration near the seismic sensor. The MEMS-based accelerometer may include a capacitive MEMS-based sensor of the type described in commonly assigned issued U.S. Pat. No. 8,104,346, which is incorporated herein by reference. In some implementations, one or more hydrophones configured for measuring pressure may be used in combination with the three-component MEMS described herein.

The seismic sensors may be implemented as a single device or as a plurality of devices. A particular seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, at a particular point, seismic data indicative of the pressure data with respect to the inline direction. In various implementations, the seismic surveying systems and methods described herein may be applied to various seismic acquisition configurations, such as, e.g., land, marine, ocean bottom referenced, borehole, etc., using various seismic acquisition systems, such as, e.g., autonomous and/or robotic systems, and/or any sort of cable configuration, etc.

Seismic Survey Data Acquisition

After deploying the vessel 111 to the survey area, one or more seismic sources 116 may be detonated to generate acoustic waves or wavefield along the paths 105 that propagate through an ocean bottom surface and into strata or interfaces 104 beneath the ocean bottom surface. As described above, the seismic sources 116 may be an air gun, marine vibrator, or non-traditional environmentally friendly source. The seismic sources may also include drilling induced acoustic pressure waves, passive seismic noise, or production induced acoustic pressure waves, such as those which may result from water or gas injections, or combinations thereof. Acoustic signals may be reflected from various subterranean geological formations, and incident acoustic signals produce corresponding reflected acoustic signals, or pressure waves, which are sensed by the multi-dimensional seismic sensor array of the seismic receivers 116. The vessel 111 may record seismic data from over one hundred seismic sensors.

The seismic sensors may generate signals referred to as "traces," which indicate the acquired measurements of the pressure wavefield and particle motion if the sensors include particle motion sensors. The traces are recorded and may be passed to a data acquisition system disposed on the vessel 111. The data acquisition system may include a digitizer, a computer system, and a storage system for storing seismic data acquired during the survey, and the storage system may include memory, such as a hard disk drive. The seismic data may be recorded continuously over days or months at a time. In another implementation, the seismic data may be recorded intermittently, such as after each detonation of the seismic source 116.

The vessel 111 may include an onboard communication unit, system, or device configured to communicate with a base station located onshore or at sea, such as on a rig or vessel. The communication unit may be used to transmit data and information associated with the vessel 111, including, e.g., position, quality control parameters, time information, and seismic survey data. The communication unit may send or receive commands particular to the seismic survey. The vessel 111 may include a power source (e.g., engine, batteries, motor, propeller, etc.) configured to drive and provide propulsion to the vessel 111. In some examples, the vessel 111 may be powered by batteries, which may be recharged by solar panels disposed on the top of the vessel 111.

In some implementations, the streamer 118 may descend in a generally vertical direction from the vessel 111 into the water column. The length of the streamer 118 may vary from less than one meter to over one kilometer. In some instances, a sub component may be disposed between the streamer 118 and the multi-dimensional seismic sensor array. The sub component 16 may be configured to provide electrical communication between the vessel 111 and the multi-dimensional seismic sensor array. In some cases, the sub component may be employed as a fairing to reduce cross-flow noise due to currents and drag forces. Further, accelerometers capable of measuring a gravity vector may be used to measure a tilt of the streamer 118 relative to the vertical.

Seismic Data Processing

Various implementations and techniques described herein refer to enhancing seismic data generated by one or more seismic sensors. As will be described herein, a data processing algorithm may be applied to seismic data that had been acquired using one or more seismic sensors. The data processing algorithm may be configured to use an inner product. Further, an enhanced inner product may be generated by estimating outliers in the inner product, removing the outliers, and replacing the removed outliers with interpolated values. Moreover, the seismic data may be enhanced by replacing the inner product with the enhanced inner product. These and various other aspects related to enhancing seismic data will be described in greater detail herein below.

Generally, conventional statistical methods attempt to deal with the influence of noise on statistical quantities, such as correlation coefficients. Conversely, aspects of the present disclosure employ methods and techniques in context of linear algebra, and not in context of conventional statistics. Inner products, or dot products (as sometimes referred to), refer to operations performed in applied linear algebra. Inner products may be utilized to accomplish fundamental operations, such as, e.g., projection of one vector onto another. Inner products may also be utilized as basic elements of more complex operations, such as, e.g., correlation, convolution, and matrix multiplication. While inner products may be used ubiquitously in their commonly defined form:

$$<X,Y> = \Sigma_i x_i y_i \text{ where a vector } X \text{ is defined by } X = (x_1, x_1, \ldots, x_n),$$

this form may not be appropriate for applications involving real data. For example, in a case where noise is present in the data, the value of the inner product may be skewed from the desired value, which we assume to be the value of the inner product calculated on the data without the noise. One solution to this problem may be to remove the noise from the data prior to computing the inner product; however, this may often not be entirely possible. In some cases, the "noise" may be part of the data (and may not be removed), but is just not desired for a particular calculation, such as, e.g., a strong reflection event intersecting with weaker events where the weaker events are those on which to operate with the inner product.

In the present disclosure, various implementations and techniques described herein are directed at defining a new class of operators to replace the conventional inner product to make it more robust in the presence of such noise and various other related problems. For instance, rather than simply performing conventional "sum of products" operations, other mathematical methods may be utilized that attempt to suppress effects of outliers, such as, e.g., noise bursts and the like. Further, the inner product may be exploited as a building block for other operations, such as, e.g., correlation, convolution, and/or matrix multiplication to extend processes to linear algebra techniques, including solving linear matrix equations.

In some situations, these robust operations may be data dependent and highly nonlinear and thus may not readily lend themselves to a unified mathematical theory, such as in traditional linear algebra. However, in the case where these operations are more accurate estimates of inner products obtained on noise-free data, this formalism may be avoided by injecting robust calculations directly into iterative solutions, such as those that are used in conjugate gradient methods for solving linear systems. As such, in some cases, it may be possible to develop this approach with some rigor to obtain an asymptotic robust linear algebra. These and various other aspects related to enhancing seismic data will be described in greater detail herein below.

Figure 2:
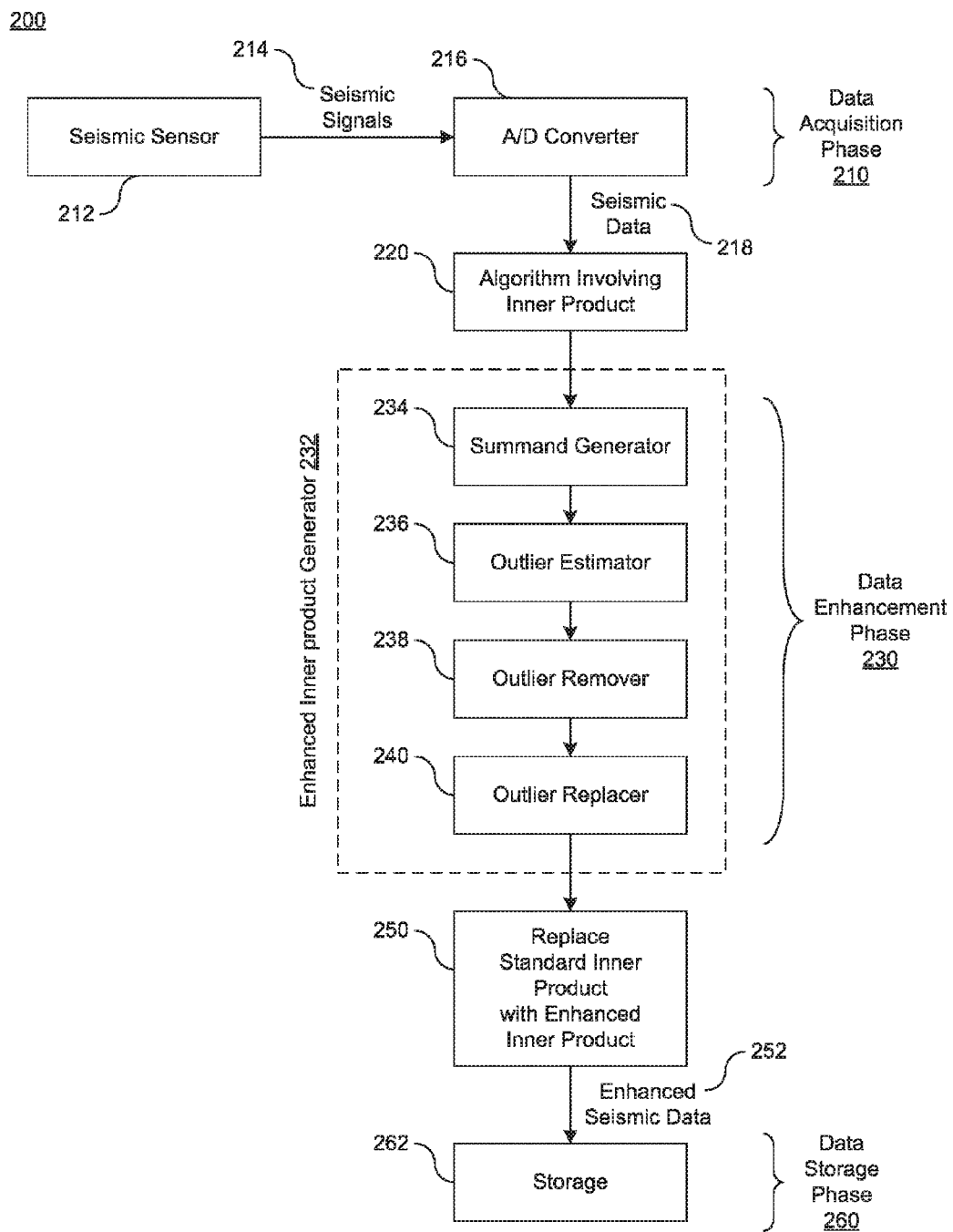
FIG. 2 illustrates a diagram of a process flow for enhancing seismic data that had been acquired using a seismic sensor in accordance with implementations of various techniques described herein.

FIG. 2 illustrates a diagram of a process flow 200 for enhancing seismic data that had been acquired using a seismic sensor in accordance with implementations of various techniques described herein.

In reference to FIG. 2, the process flow 200 may provide various stages and/or phases for enhancing seismic data. For instance, in a data acquisition phase 210, one or more seismic sensors 212 may be configured to provide seismic signals 214 (e.g., analog seismic signals), and the seismic signals 214 may be received by an analog-to-digital (A/D) converter 216. The A/D converter 216 may be configured to convert the analog seismic signals 214 to digital seismic data 218. The seismic data 218 may include a series of samples of one or more seismic signals 214 generated with the seismic sensor 214 based on various seismic events. In some cases, the seismic data 218 may include first seismic data elements, such as, e.g., a first series of samples of a first seismic signal associated with a first seismic event. In some other cases, the seismic data 218 may include second seismic data elements, such as, e.g., a second series of samples of a second seismic signal associated with a second seismic event. The first and second seismic data elements may include various types of seismic data, such as, e.g., scalars, vectors, filters, and matrix components. The first seismic event may include and/or be representative of a first shot fired by a seismic source, and the second seismic event may include and/or be representative of a second shot fired by the seismic source after firing the first shot. In some cases, the second seismic data elements may include extraneous signal noise derived from reflection of the first seismic event.

As shown in FIG. 2, the seismic data 218 may be provided to an algorithm involving an inner product 220. For instance, a data processing algorithm may be applied to the received seismic data 218, and the data processing algorithm may be configured to use an inner product, as further described herein. In a data enhancement phase 230, an enhanced inner product generator 232 may be utilized to process the seismic data 218 based on the algorithm involving the inner product 220. For instance, an output of the data processing algorithm may be provided to a summand generator 234. In some cases, the summand generator 234 may be configured to generate summands of the seismic data 218 as an inner product of multiple seismic data elements associated with one or more of the first seismic data elements and one or more second seismic data elements. In this instance, the second seismic data elements may be different than the first seismic data elements. The data enhancement phase 230 may also estimate outliers in the summands of the inner product utilizing an outlier estimator 236, remove outliers in the summands utilizing an outlier remover 238, and replace the outliers in the summands with interpolated values utilizing an outlier replacer 240.

As shown in FIG. 2, an output of the enhanced inner product generator 232 may be provided to an operation of replacing a standard inner product with an enhanced inner product 250 so as to generate and provide enhanced seismic data 252. In a data storage phase 260, the enhanced seismic data 252 may be stored in a non-transitory computer readable storage medium, such as e.g., a storage database 262.

Robust Inner Products

The following paragraphs provide additional support for various techniques described herein. A data space may include vectors of the form:

$D=S+N$, $S$ denoting signal and $N$ denoting noise

An inner product may be generated with two vectors $X_1$ and $X_2$, such that:

$<X_1,X_2> = <S_1,S_2> + <S_1,N_2> + <N_1,S_2> + <N_1,N_2>$

Assuming that the noise may be orthogonal to the data and to itself, i.e., the noise may be uncorrelated with the data and with itself. As such, $<X_1,X_2> = <S_1,S_2>$ may be obtained. However, if the noise is uncorrelated, in practice for some specific data examples, the last three (3) terms above may not be zero. This may occur for several reasons related to sampling and the data itself. For seismic data, a primary issue is that finite, discrete sampling may imply a finite, discrete sum for the inner product, and thus, the sampling may not provide enough terms in the inner product for signal to effectively cancel the effects of noise on the inner product. In practice, the computational windows may be kept small, which may exacerbate the issue. Moreover, even for the case of true random variables, any individual sum of products may not be guaranteed to be identically zero, and rather, the expected value may be zero.

Therefore, numerical calculations may be based on assuming that the noise is uncorrelated and may be skewed when computed numerically. However, if information is added to the problem, the approximation of $<X_1,X_2>=<S_1,S_2>$ may be achieved. One such assumption that fits with many noisy data situations is that the noise may be mostly well behaved, but may be contaminated with large outliers that may be relatively sparse in the data. Under this assumption, outlier components of the inner product may be analyzed, removed, and replaced before and/or after completing the calculation of the inner product. In various implementations, this analysis may be applied to either of the vectors $X_1$ or $X_2$ (or both) prior to calculating the inner product or to the products $x_i y_i$ themselves that form the inner product.

In this instance, outliers may be dealt with in various ways. For instance, in various cases, trimmed mean, median, Gaussian weighting, and other more sophisticated methods of estimating and dealing with outliers may be utilized. To illustrate this method or technique, the trimmed mean approach may be used as an example, as it is similar to ordinary inner products and may be relatively efficient to compute. In reference to outliers in the products $x_i y_i$, one technique may involve forming the normal products associated with the inner product, trimming the set of products to throw out (or remove) outliers, and then summing the remaining products to calculate the mean. For this case, a first operation for obtaining a robust inner product is to take $<X,Y>=\text{Sum}(\text{Trim}(x_i y_i))$, where the function Trim simply zeroes a portion of the products based on their magnitudes. The number of products eliminated (or removed) from the sum is a parameter that depends on the data and the noise, and there are various options such as a fixed number of terms or a percentage of terms to remove, or perhaps a dynamic estimation of outliers. Once terms are eliminated (or removed) by the Trim process, the values that have been zeroed may be estimated or accounted for, in a manner as described herein below.

EXAMPLES

Consider an example where at least two signal vectors (with 7 data elements) include (1,1,1,1,1,1,1) and (2,4,6,8, 10,−1,3), and a noise vector (−10,0,0,200,1,3,0) is added to the second vector to obtain the noisy vector (−8,4,6,208,11, 2,3). The inner product of (1,1,1,1,1,1,1) and (−8,4,6,208, 11,2,3) may be calculated in such a way that the inner product of the original vectors without noise is approximated. In this instance, the products may be calculated and are the second vector. Next, the largest and smallest data element values (208 and −8, respectively) of the products may be removed, which provides Sum(4,6,11,2,3)=26. In this instance, two (2) terms are removed, and a simple correction is to multiply by 7/5 and obtain a value of 36.4. The noise-free inner product is Sum(2,4,6,8,10,−1,3)=32. Computing the standard inner product with noise yields a value of 226. If instead, the two (2) largest and (2) smallest products are removed, then a similar calculation may provide (4+6+3)*7/3=30.33. In either case, the trimmed mean approach may provide an improved estimate of the desired inner product. Similarly, using the median value of four (4), i.e., replacing the terms with the median, 7*4=28 may be obtained, which also provides an improved estimate over a noisy inner product.

In another example, a more sophisticated method of dealing with the removal of outlier products may be employed by interpolation of the summands. For instance, in the example above, the summands are the sequence $(O_1,4,6,O_2,11,2,3)$ where $O_1$ and $O_2$ are the unknown summands at the outlier locations. In this instance, the method may interpolate for $O_2$ and extrapolate for $O_1$ to obtain the missing summands. Using linear interpolation and extrapolation, Sum(2,4,6,8.5,11,2,3)=36.5 may be provided. Other more sophisticated interpolation schemes may be employed. In this case, interpolation may be similar to the simple scaling used above. The simple scaling, M/(M−P), where M is the vector length and P is the number of outliers removed, may be equivalent to replacing the removed terms by the average of the remaining terms.

Adaptive Robust Linear Algebra

Generally, the Robust Inner Product (RIP)$<X,Y>_R$ may be defined by a two-operation process. For instance, 1. Estimate a set of outliers in the summands $x_i y_i$ of the conventional inner product and remove them. Otherwise, estimate and remove outliers in X or Y or both and form the summands from the remaining elements in X and Y, and
2. Replace the removed outliers by some estimate of the true values, i.e., the values that may be obtained without the noise in the data and form the sum of products with the modified data.

This definition may yield a class of RIPs that may depend on specific methods and/or techniques for achieving the two steps.

Having now defined a Robust Inner Product (RIP), extensions to more general linear algebra problems may be provided. Further, convolution and correlation may both be defined by a "sliding inner product". For example, convolution of g with f is:

$$(g*f)(t) = \Sigma_{k=0}^{t} g_k f_{t-k} = <g, f_t>$$

Therefore, a robust convolution may be defined as:

$$(g*f)_R(t) = <g, f_t>_R$$

A similar definition holds for robust correlations. Another aspect of linear algebra refers to solving matrix equations of the form Ax=b, where A and b are known, and x satisfies the equation. Since matrix multiplication may be defined in terms of the inner products of the rows of one matrix with columns of the other, robust matrix multiplication may be defined in terms of a RIP that yields a robust matrix multiplication insensitive to certain types of noise, and the noise may be in one matrix or the other, or sometimes, in both matrices.

While such extensions of linear algebra and signal processing are utilized, one aspect in application of RIP is in the solution of matrix equations of the form Ax=b. For a variety of reasons, such problems may be cast as a minimization of the difference $\|Ax-b\|$, and solutions to this problem may involve iterative schemes, such as steepest descent or conjugate gradient (CG) methods. A close examination of such algorithms may reveal that the iterations may involve inner products of rows and columns of A, b, and the residual term $Ax_i-b$. Thus, the tedium of formally defining a robust linear algebra and developing solutions in that framework may be bypassed, and a robust conjugate gradient iteration may be achieved by simply replacing the inner products in the iterations with a robust inner product.

The robust CG methods generally involve sorting summands to find outliers, which may be computationally intensive. In some instances, to improve computational efficiency, the process may be stopped after a few iterations to reduce the computational effort, but perhaps at the expense of accuracy. Even so, the incomplete solution from a few robust iterations is likely to be better than the standard CG solution. In any case, the examples described above are simply meant to test possible use of RIP CG solvers.

Simultaneous Source Separation

In reference to separation of simultaneous source data, a conventional industry practice is to apply a time dither to the shot timings of sources fired intentionally in an overlapping manor. As the sources are activated so as to interfere with one another, one technique refers to separating them after data acquisition phase so they appear as if they were fired without interfering. The time dither is employed to try to make the data from one source orthogonal to the data from the other source, within a common-offset gather or a common-receiver gather. Without loss of generality, two sources may be considered for recorded seismic data $D=S_1+S_2$ where $S_1 \perp S_2$. However, data window issues and the data themselves may skew inner products, and as a result, $S_1$ and $S_2$ may not be computationally orthogonal. In this case, the noise is not noise, but is the data associated with the other source. However, viewed in the time frame of one source, the other source appears to be random. By employing RIP CG solvers with this inversion approach to separating simultaneous source data, orthogonality may be enhanced, and the separation process may be improved, thus yielding less leakage or cross talk among sources.

Robust Inner Product (RIP) for Multi-Dimensional Data

As described herein above, the robust inner product (RIP) may be defined as a two-operation process of first identifying outlier summands, and then replacing them. The replacement process was demonstrated with scaling and interpolation. While scaling may extend to higher dimensions, interpolation is not well-defined for higher dimensions and how the interpolation is done may depend on expected structures in the data.

Consider the two dimensional case of taking the inner product $<X,Y>$, where $X=(x_{i,j})$ and $Y=(y_{i,j})$. Then, $<X,Y>=\Sigma_{i,j} x_{i,j} y_{i,j}$. Suppose $x_{k,l} y_{k,l}$ is identified as an outlier. By analogy, with a one-dimensional case, a replacement term may be formed by averaging four terms $x_{k+1,l} y_{k+1,l}$, $x_{k-1,l} y_{k-1,l}$, $x_{k,l+1} y_{k,l+1}$ and $x_{k,l-1} y_{k,l-1}$. However, if the data are known to be more likely continuous in a particular direction, the average may be taken or interpolated in that direction. It may be advantageous to restrict the interpolation to a subspace or a particular path or trajectory through the multi-dimensional summands. Similarly, outlier search and rejection may be limited to particular directions, subspaces, or paths through the multi-dimensional summands. Such choices will depend on how outliers are expected to occur in the data.

Matching Pursuits: Interpolation, Filtering, Deghosting, Etc.

Robust inner products and extensions to robust solvers described above have a large potential for application. Severely under-determined problems such as those that are in seismic applications may use sparseness as a method to overcome aliasing and under determination. Such approaches may use inner products to determine the most relevant portions of the data, and because of the under-determination and noise in the data, these estimations may be skewed. Employing robust calculations may improve such methods. Well known applications, such as, e.g., interpolation, deghosting, and filtering, may be well suited for robust approaches. Applications involving adaptive filtering and adaptive subtraction particularly may benefit from robust calculations.

Standard methods for these approaches may be formulated in the frequency domain in one or more variables. The same principles described above may be employed regardless of the particular domains employed. However, outliers in space-time domains may be somewhat difficult to identify in the frequency domain since the effect may be spread over multiple frequencies. It may be possible to employ more sophisticated outlier detections in the frequency domain. Methods, such as, e.g., f-x decon (or higher dimensional equivalents) may be used to operate in the frequency domain to account for outliers existing in the time domain without having to move back and forth between the transform domains. Other approaches may be utilized as well, such as, e.g., utilizing the phase of the elements to determine and replace outliers.

Migration: Cross Correlation and Deconvolution Imaging Conditions

Another prominent use of the inner product in seismic data processing is in calculating seismic images by the so-called "imaging condition". Both cross-correlation imaging conditions and a weighted version called (deconvolution imaging condition) may provide images of subsurface reflectors by cross correlation of the source wavefield with the receiver wavefield based on the principle that reflectors exist, where the down-going (source) wavefield is coincident with the upcoming (receiver) wavefield. The coincidence locations are determined essentially by cross correlation. As in other applications using inner products, cross talk between two wavefields may be suppressed in some situations by use of robust inner products.

Accordingly, various implementations of the present disclosure refer to a new class of linear algebra operations based on robust calculations. Robust inner products and robust matrix multiplication may be utilized to form a basis for data-adaptive linear algebra, where the computations themselves are based on the data. In some cases, the computations mirror standard linear algebra except that outliers are identified, removed, and replaced as part of the linear algebra computation. Various methods and techniques described herein provide a wide variety of application, such as, e.g., in a specific case of simultaneous source separation. Further, other applications may include interpolation, deghosting, migration, and/or filtering.

Figure 3:
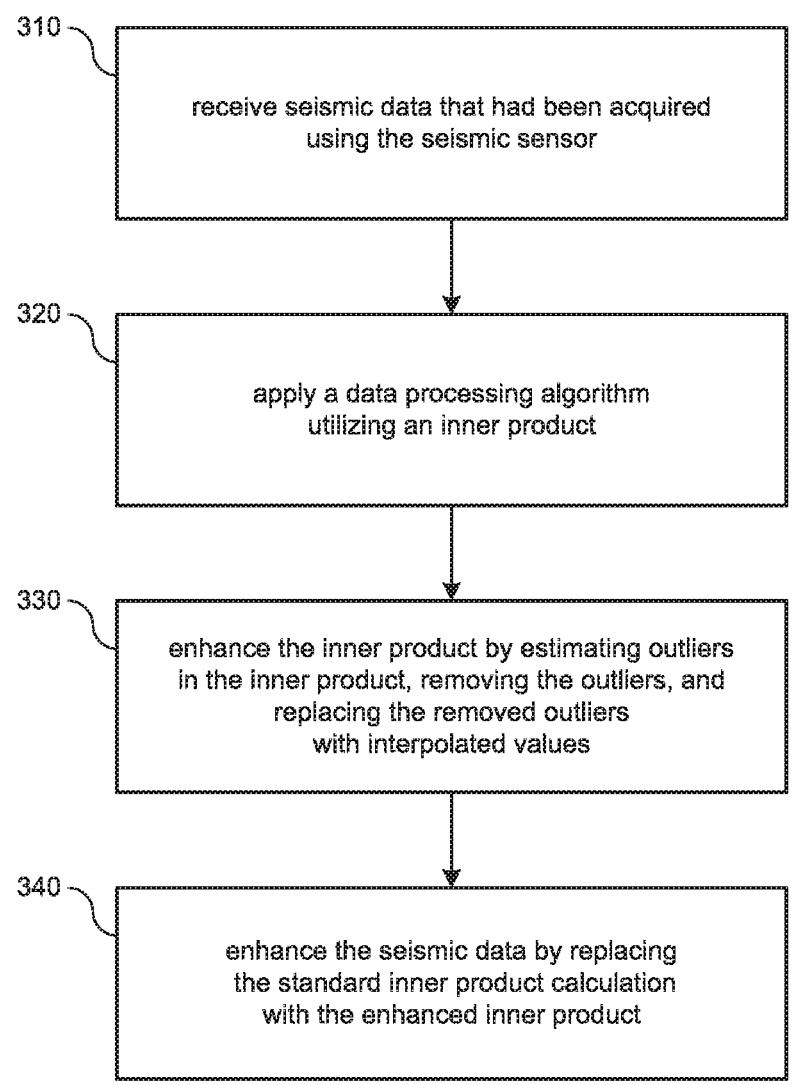
FIG. 3 illustrates a diagram of a method for enhancing seismic data that had been acquired using a seismic sensor in accordance with implementations of various techniques described herein.

FIG. 3 illustrates a diagram of a method for enhancing seismic data that had been acquired using a seismic sensor in accordance with implementations of various techniques described herein. It should be understood that while method 300 indicates a particular order of execution of operations, in some instances, portions of the operations may be executed in a different order, and on different systems. Further, in some other instances, additional operations or steps may be added to method 300. Similarly, some operations or steps may be omitted.

Figure 5:
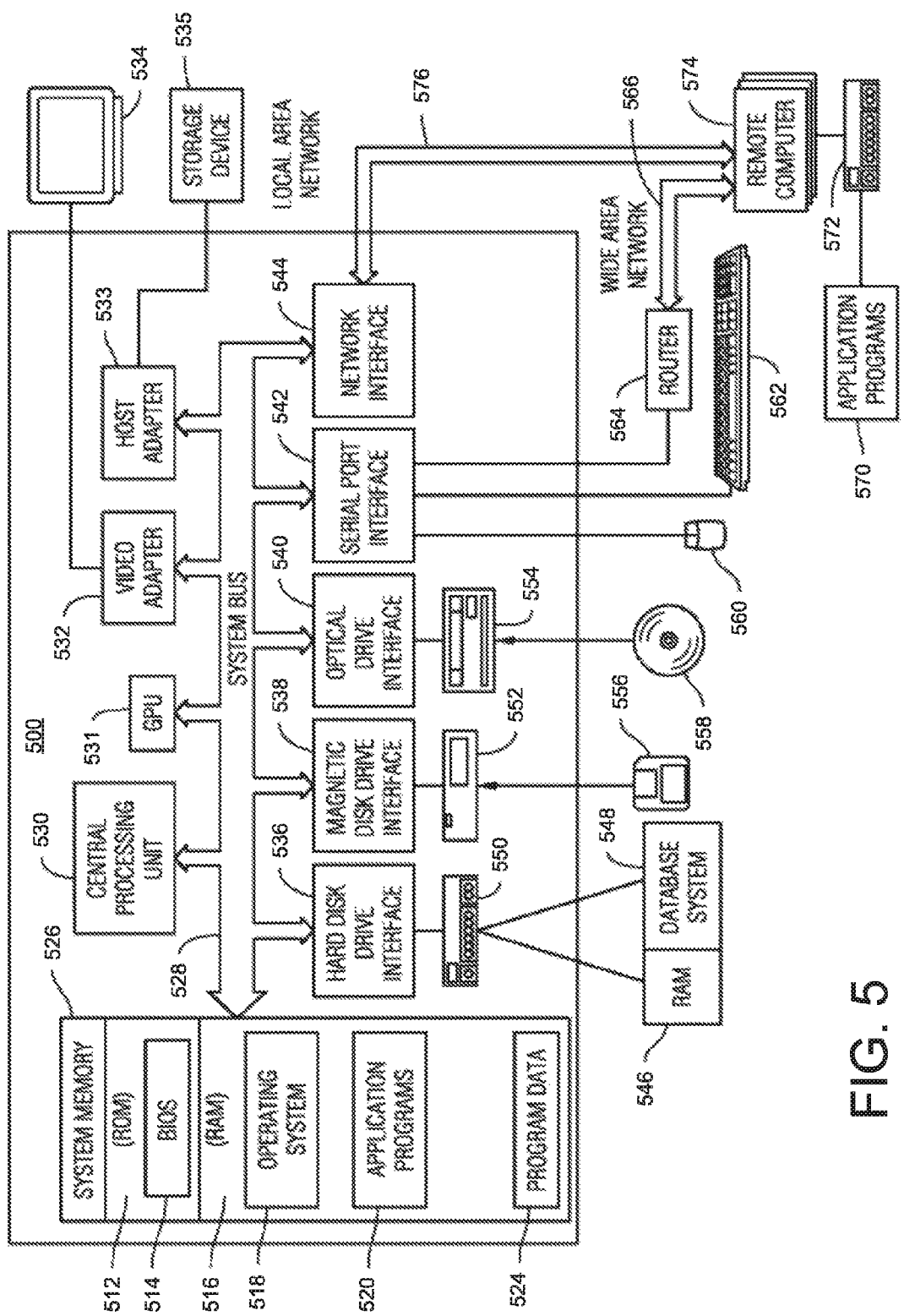
FIG. 5 illustrates a computing system in accordance with implementations of various techniques described herein.

In various implementations, method 300 may be performed and/or executed by various types of computing devices, such as, e.g., computing device 500 of FIG. 5. As described herein below, the computing device 500 may use various hardware, software, peripheral components and/or devices, and related processing capabilities to enhance seismic data that had been received from one or more seismic sensors. As such, various operations of method 300 may be implemented in hardware and/or software. For instance, if implemented in software, computer executable instructions related to various operations of method 300 may be stored in memory and/or a database. If implemented in hardware, the various operations or some combination thereof may be implemented in one or more processing components configured to interface with a computing device, such as, e.g., the computing device 500 of FIG. 5.

At block 310, method 300 may receive seismic data that had been acquired using one or more seismic sensors. At block 320, method 300 may apply a data processing algorithm to the received seismic data. The data processing algorithm may be configured to use an inner product.

At block 330, method 300 may generate an enhanced inner product by estimating outliers in the inner product, removing the outliers, and replacing the removed outliers with interpolated values. In some instances, outliers in the seismic data may be estimated prior to enhancing the inner product. Further, in some instances, outliers in the seismic data may be removed prior to enhancing the inner product. In various other instances, replacing the outliers with interpolated values may include scaling the seismic data by replacing the outliers with a mean value between neighboring summands, replacing the outliers with an average value of remaining summands, or replacing the outliers with a Gaussian weighting of remaining summands.

At block 340, method 300 may enhance the seismic data by replacing the inner product with the enhanced inner product. In some instances, the enhanced inner product may include a robust product that involves applying convolution, correlation, matrix multiplication, or conjugate gradient iteration to the seismic data.

Figure 4:
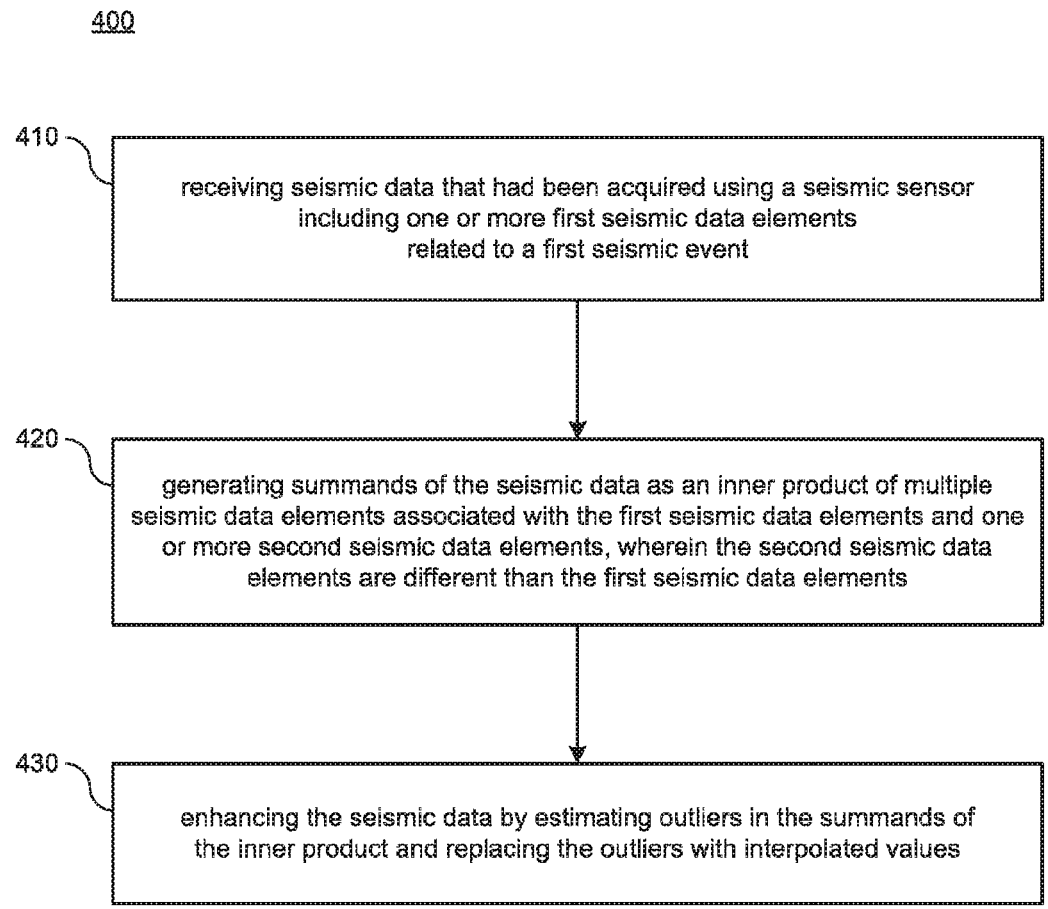
FIG. 4 illustrates a diagram of another method for enhancing seismic data that had been acquired using a seismic sensor in accordance with implementations of various techniques described herein.

FIG. 4 illustrates a diagram of another method for enhancing seismic data that had been acquired using a seismic sensor in accordance with implementations of various techniques described herein. It should be understood that while method 400 indicates a particular order of execution of operations, in some instances, portions of the operations may be executed in a different order, and on different systems. Further, in some other instances, additional operations or steps may be added to method 400. Similarly, some operations or steps may be omitted.

In various implementations, method 400 may be performed and/or executed by various types of computing devices, such as, e.g., computing device 500 of FIG. 5. As described herein below, the computing device 500 may use various hardware, software, peripheral components and/or devices, and related processing capabilities to enhance seismic data that had been received from one or more seismic sensors. As such, various operations of method 400 may be implemented in hardware and/or software. For instance, if implemented in software, computer executable instructions related to various operations of method 400 may be stored in memory and/or a database. If implemented in hardware, the various operations or some combination thereof may be implemented in one or more processing components configured to interface with a computing device, such as, e.g., the computing device 500 of FIG. 5.

At block 410, method 400 may receive seismic data that had been acquired using a seismic sensor including one or more first seismic data elements related to a first seismic event. The seismic data may include a series of samples of one or more seismic signals generated with the seismic sensor. For instance, the first seismic data elements may include a first series of samples of a first seismic signal associated with the first seismic event. In various implementations, the first and second seismic data elements may include at least one of scalars, vectors, filters, and/or matrix components. Further, the multiple seismic data elements may include at least two seismic data elements, such as, e.g., at least one seismic data element from the first seismic data elements and at least one seismic element from the second seismic data elements.

Further, in some instances, the second seismic data elements were obtained from the seismic data that had been acquired using the seismic sensor. The one or more second seismic data elements may be related to a second seismic event different than the first seismic event. The second seismic data elements may include a second series of samples of a second seismic signal associated with the second seismic event.

In some implementations, the first seismic event may be associated with a first shot fired by a seismic source, and the second seismic event may be associated with a second shot fired by the seismic source after firing the first shot. As such, in some cases, the second seismic data elements may include extraneous signal noise derived from reflection of the first seismic event.

In some implementations, the seismic sensor may include a plurality of seismic sensors. Therefore, in this instance, receiving seismic data that had been acquired using the seismic sensor may include receiving seismic data that had been acquired using the plurality of seismic sensors.

At block 420, method 400 may generate summands of the seismic data as an inner product of multiple seismic data elements associated with the first seismic data elements and one or more second seismic data elements. In some instances, the second seismic data elements are different than the first seismic data elements.

In some implementations, generating summands of the seismic data may include applying an inner product algorithm to the seismic data to generate the summands of the seismic data as the inner product of multiple seismic data elements associated with the first and second seismic data elements. In some other implementations, generating summands of the seismic data may include applying linear algebra to the seismic data to generate the summands of the seismic data as the inner product of multiple seismic data elements associated with the first and second seismic data elements.

At block 430, method 400 may enhance the seismic data by estimating one or more outliers in the summands of the inner product and replacing the one or more outliers with interpolated values. In some instances, estimating outliers in the summands of the inner product may include identifying one or more largest values and one or more smallest values in the summands. Further, the one or more largest and smallest values may be determined from either signed values or absolute values. In some implementations, enhancing the seismic data may include removing the outliers and replacing the removed outliers with the interpolated values. Further, in some implementations, removing the outliers may include zeroing one or more magnitudes of the largest values and/or one or more magnitudes of the smallest values in the summands. In some implementations, replacing outliers with interpolated values may include scaling the seismic data by replacing the outliers with a mean value between neighboring summands. In other implementations, replacing the outliers with interpolated values may include scaling the seismic data by replacing the outliers with an average value of remaining summands. Further, enhancing the seismic data may include enhancing a seismic image associated with the seismic data.

Computing System

Implementations of various technologies described herein may be operational with numerous general purpose or special purpose computing system environments or configurations. Some examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, various programmable consumer electronics, network based PCs, minicomputers, mainframe computers, smartphones, smartwatches, personal wearable computing devices and/or systems networked with other computing systems, tablet computers, and distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may also be implemented in distributed computing environments where tasks are performed by remote processing devices that are linked through a communications network, e.g., by hard-wired links, wireless links, or combinations thereof. The distributed computing environments may span multiple continents and multiple vessels, ships, or boats. In a distributed computing environment, program modules may be located in local and/or remote computer storage media including memory storage devices.

FIG. 5 illustrates a schematic diagram of a computing system 500 in which the various technologies described herein may be incorporated and practiced. In various implementations, the computing system 500 may be implemented as a special purpose machine configured for enhancing seismic data. The computing system 500 may include various types of computers, such as, e.g., server, mainframe, desktop, laptop, tablet, or various other types of computer system configurations may be used to implement marine based applications.

The computing system 500 may include a central processing unit (CPU) 530, a system memory 526, a graphics processing unit (GPU) 531 and a system bus 528 that couples various system components including the system memory 526 to the CPU 530. Although one CPU is illustrated in FIG. 5, it should be understood that in some implementations the computing system 500 may include more than one CPU. The GPU 531 may be a microprocessor specifically designed to manipulate and implement computer graphics. The CPU 530 may offload work to the GPU 531. The GPU 531 may have its own graphics memory, and/or may have access to a portion of the system memory 526. As with the CPU 530, the GPU 531 may include one or more processing units, and the processing units may include one or more cores. The system bus 528 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 526 may include a read-only memory (ROM) 512 and a random access memory (RAM) 546. A basic input/output system (BIOS) 514, containing the basic routines that help transfer information between elements within the computing system 500, such as during start-up, may be stored in the ROM 512.

The computing system 500 may include a hard disk drive 550 for reading from and writing to a hard disk, a magnetic disk drive 552 for reading from and writing to a removable magnetic disk 556, and an optical disk drive 554 for reading from and writing to a removable optical disk 558, such as a CD ROM or other optical media. The hard disk drive 550, the magnetic disk drive 552, and the optical disk drive 554 may be connected to the system bus 528 by a hard disk drive interface 556, a magnetic disk drive interface 558, and an optical drive interface 550, respectively. In some cases, the drives and their associated computer-readable media may provide non-volatile storage of computer-readable instructions, data structures, program modules, and/or various other data for the computing system 500.

Although the computing system 500 is described herein as having a hard disk, a removable magnetic disk 556 and a removable optical disk 558, it should be appreciated by those skilled in the art that the computing system 500 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which may be used to store the desired information and which may be accessed by the computing system 500. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 500 may also include a host adapter 533 that connects to a storage device 535 via a small computer system interface (SCSI) bus, a Fiber Channel bus, an eSATA bus, or using any other applicable computer bus interface. Combinations of any of the above may also be included within the scope of computer readable media.

A number of program modules may be stored on the hard disk 550, magnetic disk 556, optical disk 558, ROM 512 or RAM 516, including an operating system 518, one or more application programs 520, program data 524, and a database system 548. The application programs 520 may include various mobile applications ("apps") and other applications configured to perform various methods and techniques described herein. The operating system 518 may be any suitable operating system that may control the operation of a networked personal or server computer, such as Windows® XP, Mac OS® X, Unix-variants (e.g., Linux® and BSD®), and the like.

A user may enter commands and information into the computing system 500 through input devices such as a keyboard 562 and pointing device 560. Other input devices may include a microphone, joystick, game pad, satellite dish, scanner, or the like. These and other input devices may be connected to the CPU 530 through a serial port interface 542 coupled to system bus 528, but may be connected by other interfaces, such as a parallel port, game port or a universal serial bus (USB). A monitor 534 or other type of display device may also be connected to system bus 528 via an interface, such as a video adapter 532. In addition to the monitor 534, the computing system 500 may further include other peripheral output devices such as speakers and printers.

Further, the computing system 500 may operate in a networked environment using logical connections to one or more remote computers 574. The logical connections may be any connection that is commonplace in offices, enterprise-wide computer networks, intranets, and the Internet, such as local area network (LAN) 556 and a wide area network (WAN) 566. The remote computers 574 may be another a computer, a server computer, a router, a network PC, a peer device or other common network node, and may include many of the elements describes above relative to the computing system 500. The remote computers 574 may also each include application programs 570 similar to that of the computer action function.

When using a LAN networking environment, the computing system 500 may be connected to the local network 576 through a network interface or adapter 544. When used in a WAN networking environment, the computing system 500 may include a router 564, wireless router or other means for establishing communication over a wide area network 566, such as the Internet. The router 564, which may be internal or external, may be connected to the system bus 528 via the serial port interface 552. In a networked environment, program modules depicted relative to the computing system 500, or portions thereof, may be stored in a remote memory storage device 572. It will be appreciated that the network connections shown are merely examples and other means of establishing a communications link between the computers may be used.

The network interface 544 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 574.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations. Also, the program code may execute entirely on a user's computing device, on the user's computing device, as a stand-alone software package, on the user's computer and on a remote computer or entirely on the remote computer or a server computer.

The system computer 500 may be located at a data center remote from the survey region. The system computer 500 may be in communication with the receivers (either directly or via a recording unit, not shown), to receive signals indicative of the reflected seismic energy. These signals, after conventional formatting and other initial processing, may be stored by the system computer 500 as digital data in the disk storage for subsequent retrieval and processing in the manner described above. In one implementation, these signals and data may be sent to the system computer 500 directly from sensors, such as geophones, hydrophones and the like. When receiving data directly from the sensors, the system computer 500 may be described as part of an in-field data processing system. In another implementation, the system computer 500 may process seismic data already stored in the disk storage. When processing data stored in the disk storage, the system computer 500 may be described as part of a remote data processing center, separate from data acquisition. The system computer 500 may be configured to process data as part of the in-field data processing system, the remote data processing system or a combination thereof.

Those with skill in the art will appreciate that any of the listed architectures, features, or standards discussed above with respect to the example computing system 500 may be omitted for use with a computing system used in accordance with the various embodiments disclosed herein because technology and standards continue to evolve over time.

Of course, many processing techniques for collected data, including one or more of the techniques and methods disclosed herein, may also be used successfully with collected data types other than seismic data. While certain implementations have been disclosed in the context of seismic data collection and processing, those with skill in the art will recognize that one or more of the methods, techniques, and computing systems disclosed herein may be applied in many fields and contexts where data involving structures arrayed in a three-dimensional space and/or subsurface region of interest may be collected and processed, e.g., medical imaging techniques such as tomography, ultrasound, MRI and the like for human tissue; radar, sonar, and LIDAR imaging techniques; and other appropriate three-dimensional imaging problems.

While the foregoing is directed to implementations of various technologies described herein, other and further implementations may be devised without departing from the basic scope thereof. Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

What is claimed is:

1. A method for generating a seismic image, the method comprising:
   receiving seismic data of a subsurface region wherein the seismic data are acquired by at least one seismic sensor;
   performing an inversion approach via a conjugate gradient solver to separate two different portions of the seismic data, wherein the inversion approach comprises enhancing orthogonality of the two different portions of the seismic data for the conjugate gradient solver by analyzing components associated with an inner product of the two different portions of the seismic data and, based at least in part on the analyzing, replacing one or more of the components; and
   based at least in part on at least one of the separate two different portions of the seismic data, generating a seismic image of subsurface reflectors of the subsurface region.

2. The method of claim 1, wherein the seismic data comprises a series of samples of one or more seismic signals generated with at least one of the at least one seismic sensor, and wherein first seismic data elements comprise a first series of samples of a first seismic signal associated with a first seismic event.

3. The method of claim 1, wherein the two different portions of the seismic data comprise first and second seismic data elements that comprise at least one of scalars, vectors, filters, and matrix components.

4. The method of claim 1, wherein the two different portions of the seismic data comprise
   one or more second seismic data elements; that are related to a second seismic event different than a first seismic event, and
   a second series of samples of a second seismic signal associated with the second seismic event.

5. The method of claim 4, wherein the first seismic event comprises a first shot fired by a seismic source, and wherein the second seismic event comprises a second shot fired by the seismic source after firing the first shot.

6. The method of claim 5, wherein the second seismic data elements comprise extraneous signal noise derived from reflection of the first seismic event.

7. The method of claim 1 comprising generating summands of the seismic data by applying an inner product algorithm to the seismic data to generate the summands of the seismic data as the inner product of multiple seismic data elements associated with the two different portions of seismic data.

8. The method of claim 1 comprising generating summands of the seismic data by applying linear algebra to the seismic data to generate the summands of the seismic data as the inner product of multiple seismic data elements associated with the two different portions of seismic data.

9. The method of claim 1 comprising estimating outliers in summands of the inner product by identifying one or more largest values and one or more smallest values in the summands, wherein the one or more largest and smallest values are determined from either signed values or absolute values.

10. The method of claim 1 comprising removing outliers and replacing the removed outliers with interpolated values.

11. The method of claim 10, wherein removing the outliers comprises zeroing one or more magnitudes of the largest values and one or more magnitudes of the smallest values in summands.

12. The method of claim 1 comprising replacing outliers with interpolated values by scaling the seismic data by replacing the outliers with a mean value between neighboring summands.

13. The method of claim 1 comprising replacing outliers with interpolated values by scaling the seismic data by replacing the outliers with an average value of remaining summands.

14. A device to generate a seismic image, the device comprising:
   a processor; and
   memory having instructions stored thereon that, when executed by the processor, cause the device to:
      receive seismic data of a subsurface region wherein the seismic data are acquired by at least one seismic sensor;
      perform an inversion approach via a conjugate gradient solver to separate two different portions of the seismic data, wherein the inversion approach enhances orthogonality of the two different portions of the seismic data for the conjugate gradient solver by analysis of components associated with an inner product of the two different portions of the seismic data and, based at least in part on the analysis, replaces one or more of the components; and
      based at least in part on at least one of the separate two different portions of the seismic data, generate a seismic image of subsurface reflectors of the subsurface region.

15. The device of claim 14, wherein the conjugate gradient solver performs conjugate gradient iterations.

16. The device of claim 14 comprising instructions for replacing outliers with interpolated values by scaling the seismic data by replacing the outliers with a mean value between neighboring summands, replacing the outliers with an average value of remaining summands, or replacing the outliers with a Gaussian weighting of remaining summands.

17. The device of claim 14, wherein the conjugate gradient solver implements a conjugate gradient (CG) iterative scheme.

18. The device of claim 14, wherein the inversion approach is part of a migration application or a simultaneous source separation application.

19. A non-transitory computer-readable medium having stored thereon computer-executable instructions which, when executed by a computer, cause the computer to generate a seismic image, wherein the computer-executable instructions further cause the computer to:
   receive seismic data of a subsurface region wherein the seismic data are acquired by at least one seismic sensor;
   perform an inversion approach via a conjugate gradient solver to separate two different portions of the seismic data, wherein the inversion approach enhances orthogonality of the two different portions of the seismic data for the conjugate gradient solver by analysis of components associated with an inner product of the two different portions of the seismic data and, based at least in part on the analysis, replaces one or more of the components; and
   based at least in part on at least one of the separate two different portions of the seismic data, generate a seismic image of subsurface reflectors of the subsurface region.

* * * * *